May 31, 1966 M. O. SCOTT 3,253,452
METHOD AND APPARATUS FOR FORMING ELONGATED TUBULAR TAPERS
Filed Oct. 11, 1962 10 Sheets-Sheet 1

INVENTOR.
Mertz O. Scott
BY
His Attorney

INVENTOR.
Mertz O Scott
His Attorney

INVENTOR.
Mertz O. Scott

INVENTOR.
Mertz O. Scott

INVENTOR.
Mertz O. Scott
His Attorney

May 31, 1966 M. O. SCOTT 3,253,452
METHOD AND APPARATUS FOR FORMING ELONGATED TUBULAR TAPERS
Filed Oct. 11, 1962 10 Sheets-Sheet 9
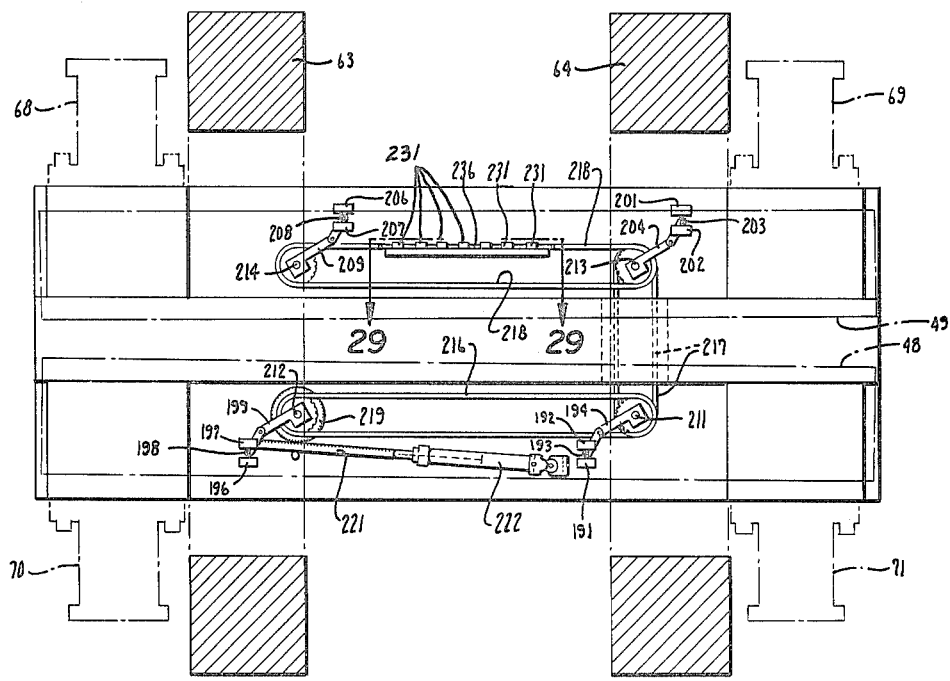
Fig. 28
Fig. 29
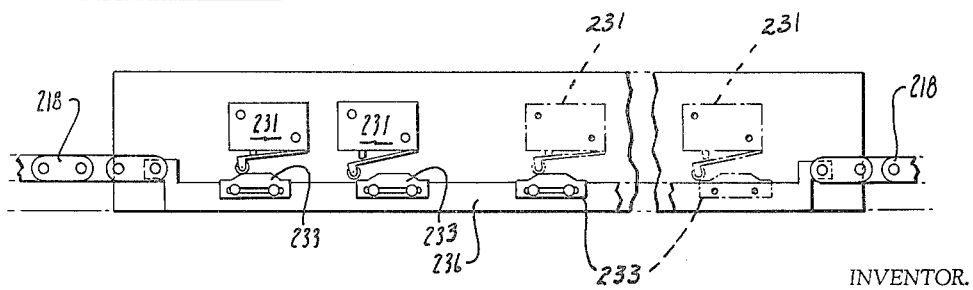
INVENTOR.
Mertz O. Scott
BY *Manfred M Warren*
Attorney United States Patent Office 3,253,452
Patented May 31, 1966

3,253,452
METHOD AND APPARATUS FOR FORMING ELONGATED TUBULAR TAPERS
Mertz O. Scott, Oakland, Calif., assignor to Weldrite Company, Oakland, Calif., a partnership
Filed Oct. 11, 1962, Ser. No. 229,913
15 Claims. (Cl. 72—368)

The invention relates to methods and apparatus for forming elongated tubular articles from sheet stock, particularly articles of circular cross-section such as pipe, light standards, and the like.

An object of the present invention is to provide a method for forming elongated tubular tapers of the character described which will provide for precision forming from sheet stock of tapers having a very high overall quality, uniform strength and a final preset, stress relieved, form.

Another object of the present invention is to provide a method and apparatus for forming elongated tubular tapers of the character above wherein the production of the tubular tapers may be rapidly, efficiently and precisely accomplished in a single machine, and in which the final forming steps may be effected in a single closure of elongated press dies running the full length of the taper.

The invention possesses other objects and features of advantages, some of which of the foregoing will be set forth in the following description of the preferred form of the invention which is illustrated in the drawings accompanying and forming part of this specification. It is to be understood however, that variations in the showing made by the said drawings and description may be adopted within the scope of the invention as set forth in the claims.

Referring to said drawings (10 sheets):

FIGURE 28 is a plan view of part of the control apparatus.

FIGURE 29 is an enlarged elevation of a portion of the mechanism illustrated in FIGURE 28.

Figure 20:
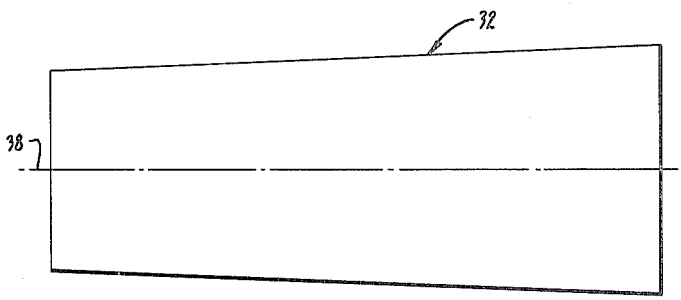
FIGURE 20 is a plan view of a trapezoidal metal sheet from which the taper is formed.
Figure 21:
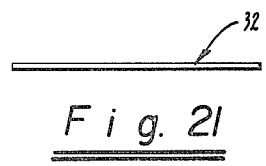
FIGURE 21 is an end view of the sheet shown in FIGURE 20.
Figure 26:
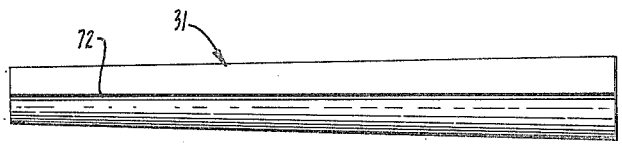
FIGURE 26 is a plan view of the taper as formed by the press.
Figure 27:
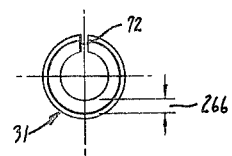
FIGURE 27 is an end view of the taper illustrated in FIGURE 26.

The present method and apparatus is used for forming an elongated tubular taper 31 of circular cross-section, such as shown in FIGURES 26 and 27 from a trapezoidal sheet 32, such as illustrated in FIGURES 20 and 21, having a width symmetrical to a longitudinal axis 33. Briefly stated, the method of the present invention consists in first bending sheet 32 along its longitudinal axis, see FIGURES 8 to 11, to form a symmetrical U-shape having a curved base 34 extending along the longitudinal axis 33 and a pair of convergently tapered sides 36 and 37 extending therefrom; next applying force on the base 34 and the free edges 38 and 39 of the sides, see FIGURES 15 and 16, to effect compression displacement of the sheet causing an outward bowing action of the sides 36 and 37 away from each other and toward a circular conformation; regulating this compression displacement as a function of length of the sheet along the axis so that the longitudinally tapered sides 36 and 37 will be uniformly and simultaneously subjected to this bowing action over their full length; and finally, holding the sides to a circular form in cross-section, see FIGURE 17, but having a circumference varying along the length of the sheet as a function of the width of the sheet.

To accomplish the foregoing, four sets of interrelated and interfunctioning dies are used in a successive order. Die member 41 is formed with an elongated semi-circular die cavity 42 having a radius progressively changing as a function of length so that the die cavity 42 forms one-half of an enclosure for the elongated taper 31. A second die member 43 is formed with an opposed complementary die cavity 44, see FIGURES 13 to 19, having a closed position with die cavity 42 so as to provide the tapered enclosure. In other words, die cavity 44, like cavity 42, is formed with a radius progressively changing as a function of length so that it forms one-half of the tapered enclosure. Co-operating with die members 41 and 43 is means, here consisting of two hydraulic actuators 46 and 47, and controls therefor, see FIGURES 7 and 30, for moving the die members to closed position at rates of displacement varying longitudinally of the die cavities as a function of length and being so controlled that all longitudinal portions of the die cavities will arrive at closed position at substantially the same time.

Figure 4:
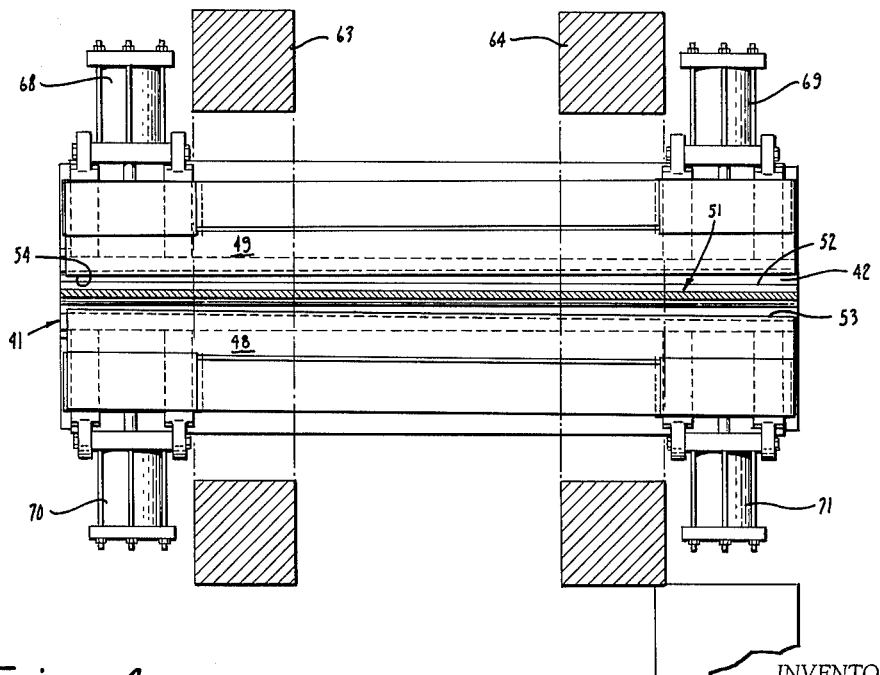
FIGURE 4 is a plan sectional view on an enlarged scale and is taken substantially on the plane of line 4—4 of FIGURE 1.

As above noted, dies 41 and 43 are adapted to operate upon sheet 32 after the latter has been bent along its longitudinal axis to form a symmetrical U-shape having a curved base 34 and convergently tapered sides 36 and 37. A pair of additional sets of dies are used for forming this metal shape. The first of these, as illustrated in FIGURE 8, are a pair of elongated blade-like members 48 and 49 which are mounted for reciprocation in superimposed relation to die cavity 42 and extend longitudinally on opposite sides thereof for the full length of the die cavity, see FIGURE 4. These blade members 48 and 49 are here mounted in a horizontal plane for support of sheet 32 with the latter mounted with its center line aligned with the center line of die cavity 42. A fourth die member 51 having an elongated metal forming portion 52 is mounted in opposed relation to die cavity 42 and has a length substantially coextensive therewith and a width, see FIGURE 8, dimensioned to enter cavity 42. The elongated metal forming portion 52 of die 51 is thus disposed for engagement with the sheet 32 along its longitudinal center. Accordingly, as a relative displacement of dies 41 and 51 is effected, see FIGURE 9, sheet 32 is deformed over the opposed edges 53 and 54 of blade members 48 and 49 and into cavity 42 to provide the symmetrical U-shape aforementioned and disposing the base 34 of the sheet on the bottom of cavity 42 and the opposite sides 36 and 37 of the sheet against the opposed edges 53 and 54 of the blade members 48 and 49. In effecting this relative displacement between die members 41 and 51, it is essential that the metal forming portion 52 enter cavity 42 at different rates of speed as viewed along the length of the die members so that the large width end of the sheet will be pressed home into the bottom of die cavity 42 simultaneously with a similar pressing home of all other longitudinal portions of the sheet. A greater relative displacement between the die members accordingly takes place at the large end of the sheet than at the small end of the sheet. This controlled displacement is here effected by the hydraulic actuators 46 and 47 and the control apparatus illustrated in FIGURES 7 and 30. Accordingly, die member 41 is here mounted on the upper ends of hydraulic rams 56 and 57 forming part of the hydraulic actuators 46 and 47 and the horizontally reciprocating blade members 48 and 49 are mounted on the top of die member 41 for vertical movement therewith. Die member 51 is mounted with die member 43 on a top supporting structure 58 for interchangeable positioning in registration with die member 41, structure 58 being here rigidly secured in fixed relation to the cylinders 61 and 62 of hydraulic actuators 46 and 47 by frame supports 63 and 64.

Figure 9:
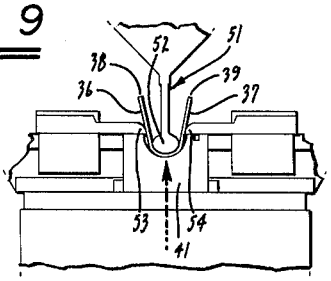
FIGURE 9 is an end elevation of the parts in completing the first metal forming step.
Figure 10:
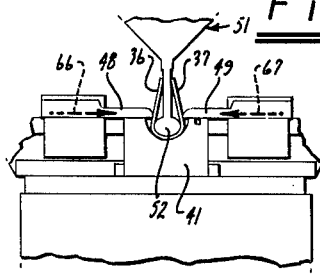
FIGURE 10 is an end elevation of the parts in effecting the second metal forming step.
Figure 11:
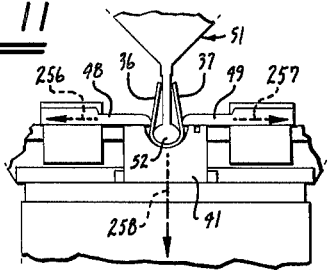
FIGURE 11 is an end elevation of the parts showing their movement to complete the second metal forming step.
Figure 23:
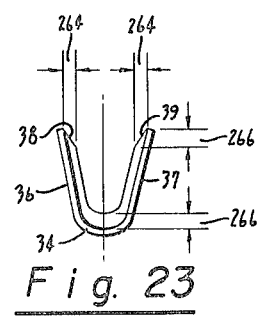
FIGURE 23 is an end view of the sheet illustrated in FIGURE 22.
Figure 25:
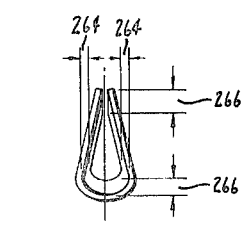
FIGURE 25 is an end view of the sheet illustrated in FIGURE 24.

As will be observed from FIGURES 9 and 23, the sides 36 and 37 of the sheet initially diverge from the base 34 as the sheet is folded over the opposing edges 53 and 54 of the blade members 48 and 49 and into the recess 42. The displacement of sides 36 and 37 from a divergent to a convergent arrangement, as above discussed, is effected by jointly displacing blade members 48 and 49 towards each other, as depicted by arrows 66 and 67 in FIGURE 10, so as to engage and displace the sheet sides to planes converging upwardly from the sheet base 34. This joint displacement of members 48 and 49 is here effected at rates which vary longitudinally of the members as a function of length and proportional to the width of the sheet so that all longitudinal portions of the sheet sides will be simultaneously brought into the desired U-shape conformation as shown in FIGURES 10 and 25. Means for so displacing the blade member 48 and 49 here consist of a pair of longitudinally spaced hydraulic actuators 68 and 69, see FIGURE 4, connected to blade member 48 and a pair of hydraulic actuators 70 and 71 connected to blade member 49. Hydraulic fluid is fed to these actuators by way of a control system, see FIGURES 28, 29 and 30, for regulating the displacement of the blade members 48 and 49 as above discussed.

Figure 16:
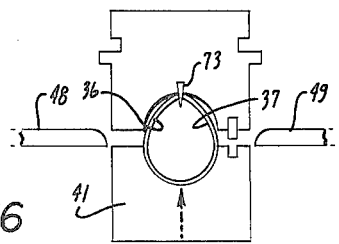
FIGURE 16 is an end elevation of the parts as they appear during the fourth step.
Figure 17:
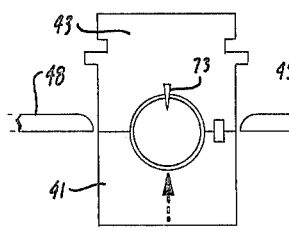
FIGURE 17 is an end elevation of the parts as they appear at the completion of the fourth step.
Figure 18:
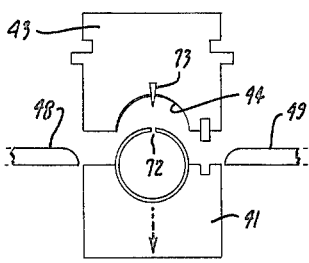
FIGURE 18 is an end elevation of the parts as they appear in the final fifth step operation of the machine.

As a feature of the present invention, the sheet 32 is held to a circumference in the compression displacement step illustrated in FIGURES 16 and 17 which is less than the width of the sheet at each longitudinal position thereon so as to provide a circumferential fore-shortening of the sheet and flow of material therein. In this step, the material is upset passed its yield point and the final shape of the taper is round and of uniform wall thickness and without spring back of the member upon opening of the dies, as illustrated in FIGURE 27. As another feature of the invention in the final forming step of the taper, the free edges 38 and 39 of the sheet are held in fixed spaced apart relation during the aforementioned circumferential fore-shortening of the sheet to prevent interfolding and shearing action of the sheet edges and to define a longitudinally extending peripheral slot 72 in the taper, as illustrated in FIGURES 26 and 27. This latter feature is obtained by the provision in die cavity 44 of a longitudinally extending internally projecting protuberance 73 which is positioned along the longitudinal center of the cavity for engagement with the free edges 38 and 39 of the sheet and for holding such edges in fixed spaced apart relation during the closing movement of the die cavities. Preferably, the protuberance is of wedge shape pointed outwardly from the surface of the die cavity so as to facilitate the removal of the edges from the protuberance upon opening of the dies. Slot 72 may be closed as by welding to complete the taper.

Figure 1:
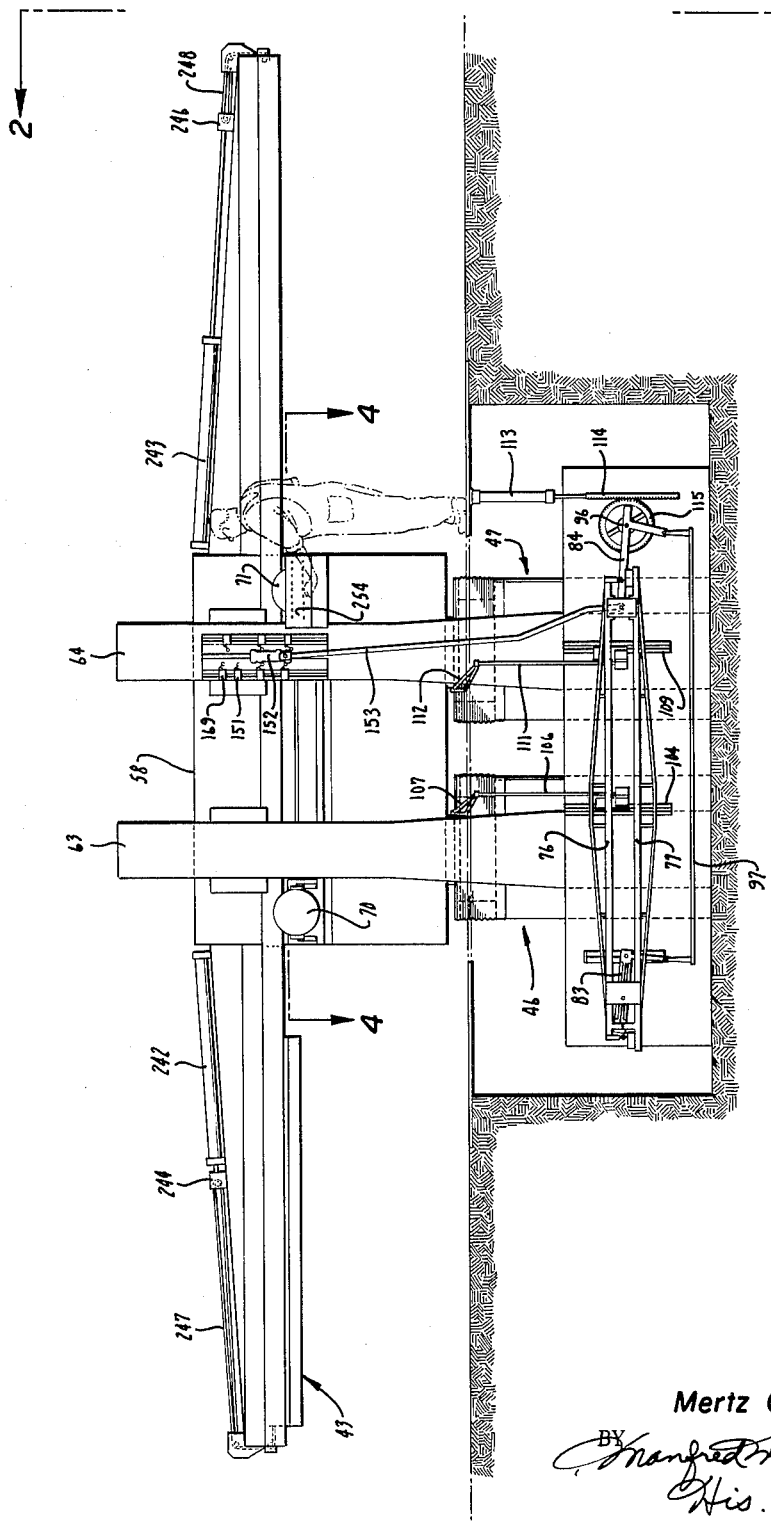
FIGURE 1 is a side elevation of an apparatus for forming elongated tubular tapers constructed in accordance with the present invention.
Figure 7:
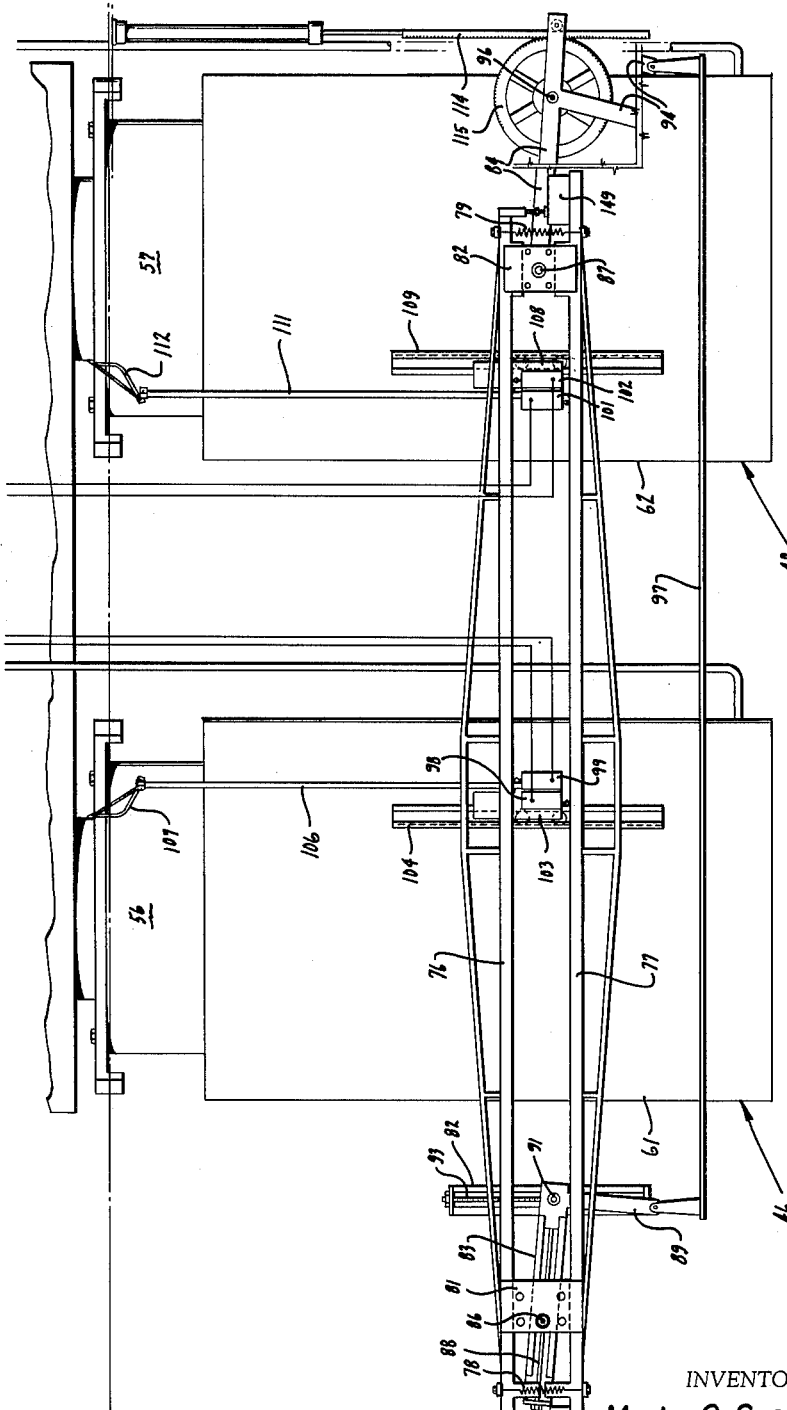
FIGURE 7 is a side elevation of a portion of the control apparatus.
Figure 8:
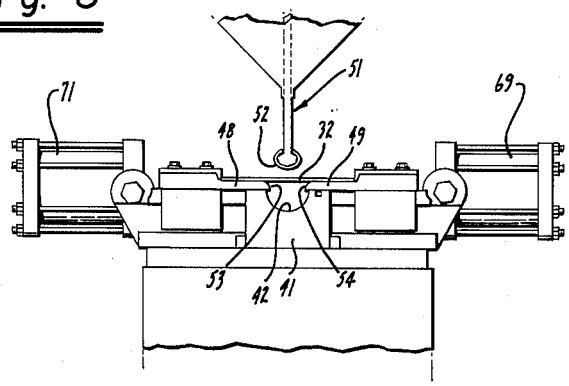
FIGURE 8 is an end elevation of a portion of the apparatus as the parts appear at the beginning of the first metal forming step.

With reference to FIGURES 1, 3, 7 and 30, it will be observed that to form a taper of the character herein described, it is necessary that hydraulic ram 56 move a lesser distance than ram 57, although both rams start and stop at the same time. To accomplish this, the flow of hydraulic fluid into clyinders 61 and 62 is controlled so that there is a greater flow into cylinder 62. The mechanism for controlling this, as illustrated in FIGURES 1 and 7, consists of a pair of vertically spaced horizontally extending control bars 76 and 77 which are secured together at this opposite ends by springs 78 and 79 resiliently holding the bars against spacer blocks 81 and 82. The bar asembly is supported on two arms 83 and 84 which are secured by hinge joints 86 and 87 to the spacer blocks 81 and 82. Arm 83 is here formed as a bell crank in which hinge joint 86 is carried as a slide in arm 83 with the longitudinal position of the hinge joint being adjustable by bolt 88. Arm 83 is formed with a right angular extension arm 89 and a vertically adjustable hinge joint 91 is provided at the intersection of the two arms and which is mounted in a vertical guide 82 for adjustable positioning by bolt 93.

Arm 84 is similarly formed as a bell crank having an angular extension arm 94 and a fixed pivotal joint 96 at the intersection of the arms providing their support. A link 97 is pivoted to the outer ends of arms 89 and 94 to provide their joint rotation.

Two micro-switches 98 and 99 are mounted between bars 76 and 77 for controlling the flow of hydraulic fluid into and from cylinder 61; and two micro-switches 101 and 102 are mounted between bars 76 and 77 for controlling the flow of hydraulic fluid into and from cylinder 62. Switches 98 and 99 are mounted on a carriage 103 travelling on a vertical guide 104 and being connected by arm 106 to a bracket 107 at the head end of ram 56. Similarly, micro-switches 101 and 102 are mounted on carriage 108 travelling on vertical track 109 and being connected by arm 111 to bracket 112 at the head end of ram 57.

Figure 30:
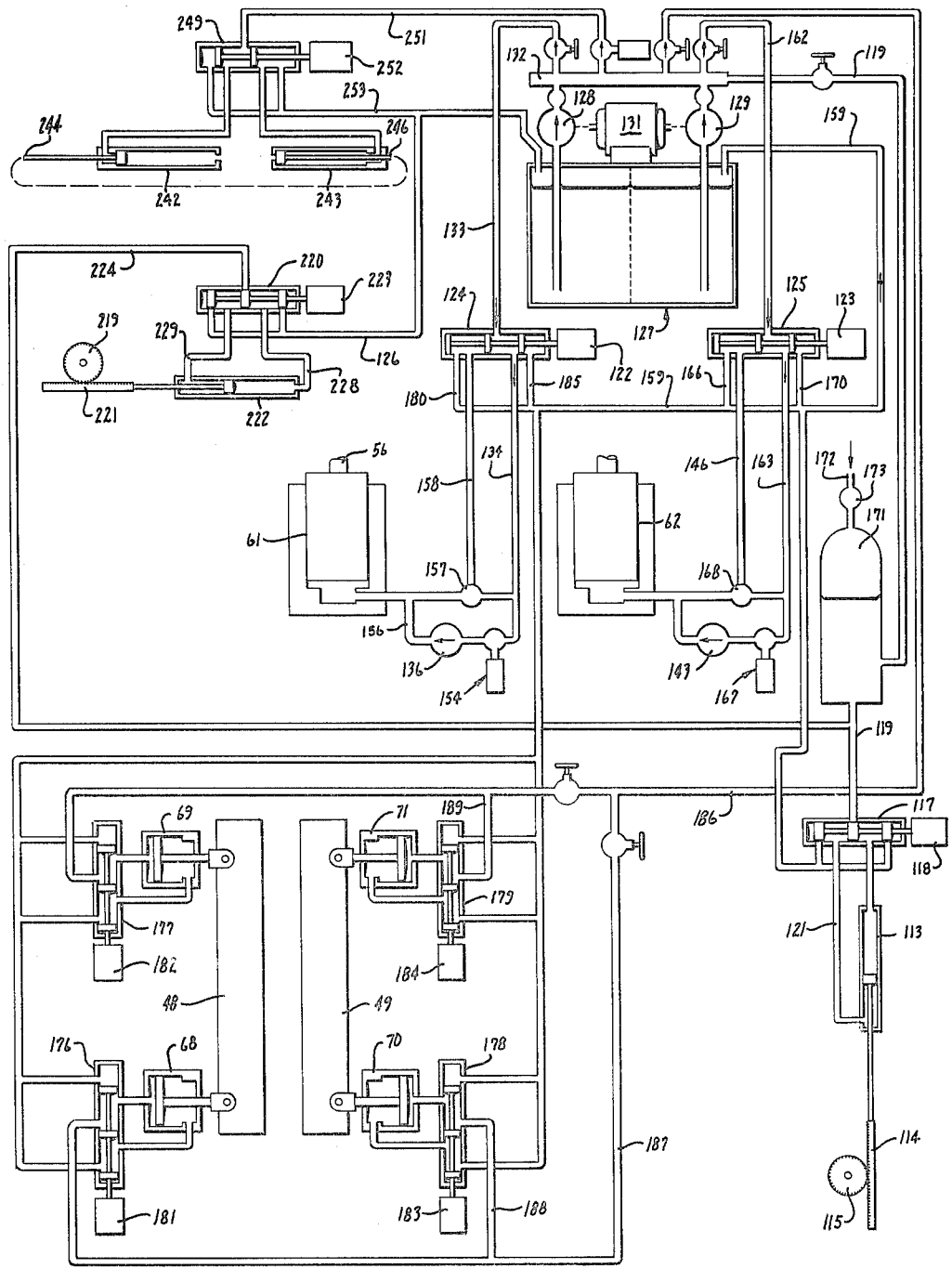
FIGURE 30 is a diagrammatic representation of the hydraulic control system used in the apparatus.

Vertical displacement of the bar and micro-switch assembly is here effected by a hydraulic actuator 113, see FIGURES 1 and 30, which is connected to a gear rack 114 in turn enmeshed with pinion 115 connected to arm 84 at pivot 96.

As will be observed in the above arrangement, the control bars 76 and 77 have different rates and amplitudes of movement at the location of the micro-switches 98–99 and 101–102. At the location of micro-switches 98 and 99, the vertical motion of the bars is equal to the distance ram 56 moves, and likewise at the location of micro-switches 101 and 102, the vertical motion of the bars is equal to the distance that ram 57 moves. The effective lengths of arms 83 and 84 control the differential in vertical motion between the two control points represented by carriages 103 and 108. By turning bolt 88, the effective length of arm 83 may be changed to establish a different ratio between the two arm lengths. Such adjustment makes it possible to adapt the press for tubular poles of different amounts of taper. By adjusting bolt 93, the position of the rams 56 and 57 at any one time can be changed. For example, the height the rams reach at the top of the stroke may be thus set; and this adjustment will not affect the ratio movement of the rams. Bolt 93 raises or lowers the control bars without changing the geometry of their motion.

Hydraulic actuator 113 is under the control of a four-way valve 117, see FIGURE 30, actuated by a solenoid 118 which may be under manual or automatic electric control. Energizing of solenoid 118 causes a displacement of valve 117 so as to permit hydraulic fluid under pressure from conduit 119 to flow through the valve and to the head end of the cylinder of hydraulic actuator 113 by conduit 121, thereby displacing rack 114 downwardly as viewed in FIGURES 1, 7 and 30, thus raising the control bar mechanism. As bars 76 and 77 raise, bar 77 closes micro-switches 98 and 101. In turn, these switches energize solenoids 122 and 123 connected to four-way valves 124 and 125 which allows hydraulic fluid to flow into the main cylinders 61 and 62. As will be seen from FIGURE 30, hydraulic fluid is drawn from a reservoir 127 by a pair of relatively low pressure pumps 128 and 129 driven by electric motor 131. The output of pumps 128 and 129 is connected to a manifold 132 and from there by conduit 133 to the four-way valve 124. Conduit 134 leads from valve 124 to cylinder 61 for conducting hydraulic fluid thereto, and there is also interposed as a parallel connection in this line a high pressure booster pump 136. As a matter of economical design, pump 128 may be of relatively high capacity and low pressure capable of effecting a rather rapid displacement of ram 56 over the greater portion of its stroke. High pressure pump 136 may then be brought into action only adjacent the end of the stroke where maximum pressure is required; and such action is here arranged to be effected by a micro-switch 151, see FIGURE 1, mounted for closing by a vertically reciprocating actuator 152 connected by arm 153 to the control bar mechanism 76–77 so as to close switch 151 adjacent the top of the stroke where maximum pressure is required. A solenoid valve 154 is connected, see FIGURE 30, in a branch line conduit 156 with high pressure pump 136, and is connected to switch 151 so that as the rams 56 and 57 approach the top of their stroke solenoid valve 154 will be opened so as to direct fluid from conduit 134 to booster pump 136 and the high pressure output of that pump is then directed through conduit 156 to cylinder 61. By way of illustration only, booster pump 136 may be designed for, say, a three to one step-up in pressure. The output pressure of pumps 128 and 129 may be in the order of up to about 1000 pounds per square inch so that the maximum pressure applied to cylinder 61 from booster pump 136 will be in the order of about 3000 pounds per square inch. A pilot operated check valve 157 is here mounted in branch line 160 connecting supply line 134 to cylinder 61 in parallel with the booster pump and solenoid valve.

Booster pump 136 is here depicted of the self-energizing type such as manufactured by Racine Hydraulics and Machinery, Inc., of Racine, Wisconsin. These pumps are generally known as pressure booster, hydraulically operated, continuous performance and are available in various pressure booster ranges such as three to one, five to one, seven to one, etc. Low pressure oil is fed to a relatively large cylinder containing a reciprocating piston through an appropriate valve mechanism for producing reciprocation of the piston. This piston is connected to one or more smaller pistons which is mounted in a pump cylinder for producing a high pressure delivery. The maximum pressure of the booster pump is adjusted so as to effect a full closing of the press dies, and when this point is reached, the reciprocating booster pump will automatically stop operating. Accordingly, as switch 151 is closed to open solenoid valve 154, oil will be supplied from conduit 134 to the booster pump and then to the cylinder 61 to effect the final closure of the dies. Switch 151 remains closed as the dies move to closed position when at the top of the stroke, actuator 152 opens micro-switch 169 which is connected for controlling solenoid 118 thereby displacing four-way valve 117 to neutral position which holds the apparatus at the top of the stroke. Switch 151 remains closed in this position.

Start of the down-stroke is under the control of the operator who throws a switch in switch panel 254, see FIGURE 1, which is connected to solenoid 118 to throw four-way valve 117 into position reversing the motion of rack 114. Micro-switches 98 and 101 open; micro-switches 99 and 102 close, thereby actuating solenoids 122 and 123 for effecting a reverse actuation of four-way valves 124 and 125. In this position of the valves, fluid flows through conduits 158 and 146 to the pilot operated check valves 157 and 168. This type of valve is produced by Racine Hydraulics and Machinery, Inc., under the general trade style of directional control check valve, pilot operated. Model No. OB1POKP116N is illustrative. The action of fluid pressure applied to the valves through conduits 158 and 146 cause these valves to open, thereby permitting return flow of fluid from cylinders 61 and 62 back through supply conduits 134 and 163 to the reservoir.

As long as switches 99 and 102 remain in contact with bar 76, the main rams 56 and 57 will move down. A ram which is moving too fast is corrected for by the automatic opening of its control micro-switch.

An identical hydraulic fluid system is provided for hydraulic actuator cylinder 62 and includes conduit 162 leading from manifold 132 to valve 125; conduit 163 leading from valve 125 to cylinder 62 through pilot operated check valve 168; high pressure booster pump 143 and solenoid valve 167 connected in a branch line as above described; conduit 146 connecting valve 125 to check valve 168; and conduits 166 and 170 connecting valve 125 with return line 159 and which correspond with conduits 180 and 185 similarly connecting valve 124 with return line 159.

In accordance with the foregoing construction, rams 56 and 57 will continue to rise as long as micro-switches 98 and 101 remain in contact with bar 77. If one of the rams is moving too fast, the micro-switch controlling it will move away from the bar. When the switch opens, flow of hydraulic fluid to the cylinder is stopped until the control bar catches up and closes the switch starting motion of the ram again. These micro-switches may be sensitive to a small fraction of an inch.

If, for some reason, the control mechanism does not function properly and one of the rams tries to overrun the control bars, a pair of micro-switches 148 and 149 will open, shutting off the fluid supply. These two micro-switches 148 and 149 are positioned at the opposite ends of the bar assembly, between the two bars and are held normally engaged by springs 78 and 79. However, any undue pressure on the bars will cause them to separate, thus breaking contact with either micro-switch 148 or 149 thus stopping the press. Preferably an air pressure cylinder 171 is mounted in the fluid supply line 119 to four-way valve 117 controlling the rack 114, see FIGURE 30, so as to insure the maintenance at all times of adequate operating pressure for the control apparatus. As here shown, conduit 119 leads from manifold 132 to the air cylinder and then to the four-way valve 117. Air pressure may be introduced into the cylinder through conduit 172 and check valve 173.

The control apparatus for blades 48 and 49 is illustrated in FIGURES 28, 29 and 30. As above noted, the opposite ends of the blade members are connected to hydraulic actuators 68–71 so that the blade members may be moved to and from each other with varying rates of speed, varying as a function of their length. Actuators 68–71 are here controlled by four-way valves 176, 177, 178 and 179, in turn controlled by solenoids 181, 182, 183, and 184 respectively. Fluid under pressure is supplied from manifold 132 through conduit 186 and connecting conduits 187, 188 and 189 to the several four-way valves 176–179. Control of solenoid 181 is here effected by a pair of opposed micro-switches 191 and 192 which are mounted for movement with blade 48 adjacent its connection to hydraulic actuator 71. As will be observed in FIGURE 28, these two micro-switches are selectively operated by an actuating block 193 mounted in a guide for movement therebetween and driven by a rotating arm 194. A similar pair of micro-switches 196 and 197, actuator block 198 and arm 199 is provided on blade 48 adjacent the connection of actuator 70; opposed micro-switches 201 and 202, actuator block 203 and arm 204 for hydraulic actuator 69; and opposed micro-switches 206 and 207, actuator block 208 and arm 209 for hydraulic actuator 68. Arms 194, 199, 204 and 209 are rotated in unison by their connection to shafts 211, 212, 213 and 214 respectively. Chains 216, 217 and 218 appropriately entrained around chain sprockets on these shafts provide for their common drive. One of the shafts, here shaft 212 is provided with a pinion 219 which is engaged by a rack 221 in turn connected to hydraulic actuator 222 so that reciprical movements of the actuator 222 will be accompanied by reciprocal rotary movement of arms 194, 199, 204, and 209. As the hydraulic actuator moves in one direction, the several arms will move in a common direction to close one of the pair of switches associated therewith so as to displace blade members 48 and 49 in one direction (approaching or withdrawing) and movement of actuator 222 in an opposite direction will cause the several arms to move in an opposite direction to engage the opposite set of switches to cause movement of the blade members in an opposite direction. The positioning of the sliding control blocks 193, 198, 203 and 208 between the two micro-switches causes this system to work similarly to the control system for the hydraulic actuators 46 and 47. In other words, each end of the blade members 48 and 49 will continue to move so long as the controlling micro-switch is energized. If the blade end gets ahead of the control arm, the micro-switch will open and the blade will stop until the arm catches up. By making arm 194 longer than arm 199, the two ends of blade 48 will move at different rates and over different distances during the same time. Similarly, by making arm 204 longer than arm 209 a similar result occurs with regard to the displacement of blade 49.

With reference to FIGURE 30, it will be noted that the control of actuator 222 is effected by a four-way valve 220 in turn controlled by solenoid 223. Four-way valve 220 here receives fluid under pressure by way of conduit 224 connected to manifold 132, and fluid return to reservoir 127 is here effected by conduit 126. Connections of the four-way valve to hydraulic actuator 222 is here by conduits 227 and 228.

A series of limit switches 231, here six in number, see FIGURES 28 and 29, are here connected to solenoid 223 for causing the forward and reverse movements of the apparatus controlled thereby at the ends of the controlled strokes of the blade members 48 and 49. These switches are mounted for actuation by a series of six cams 233 carried by a bar 236 secured to and displaced by chain 218.

Figure 5:
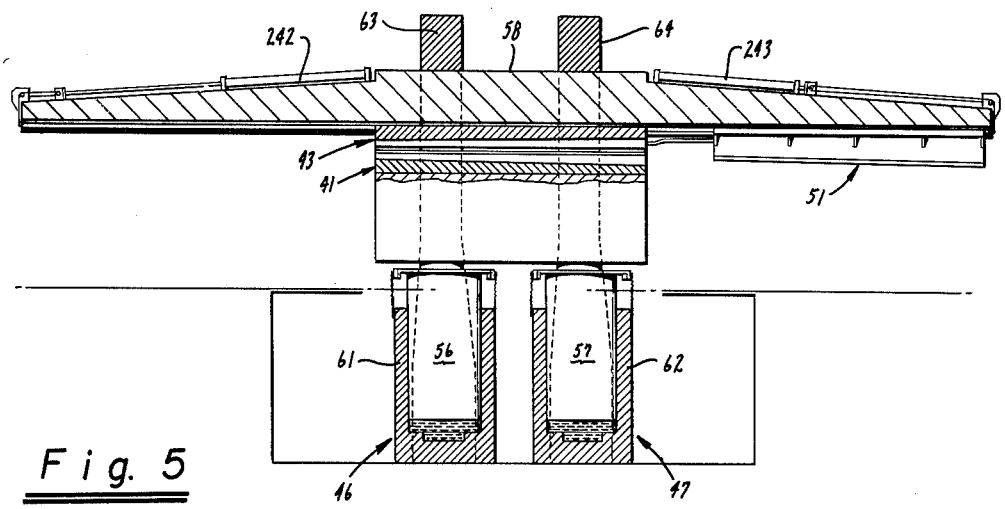
FIGURE 5 is a vertical cross-sectional view similar to FIGURE 3 but showing parts in a different position.
Figure 6:
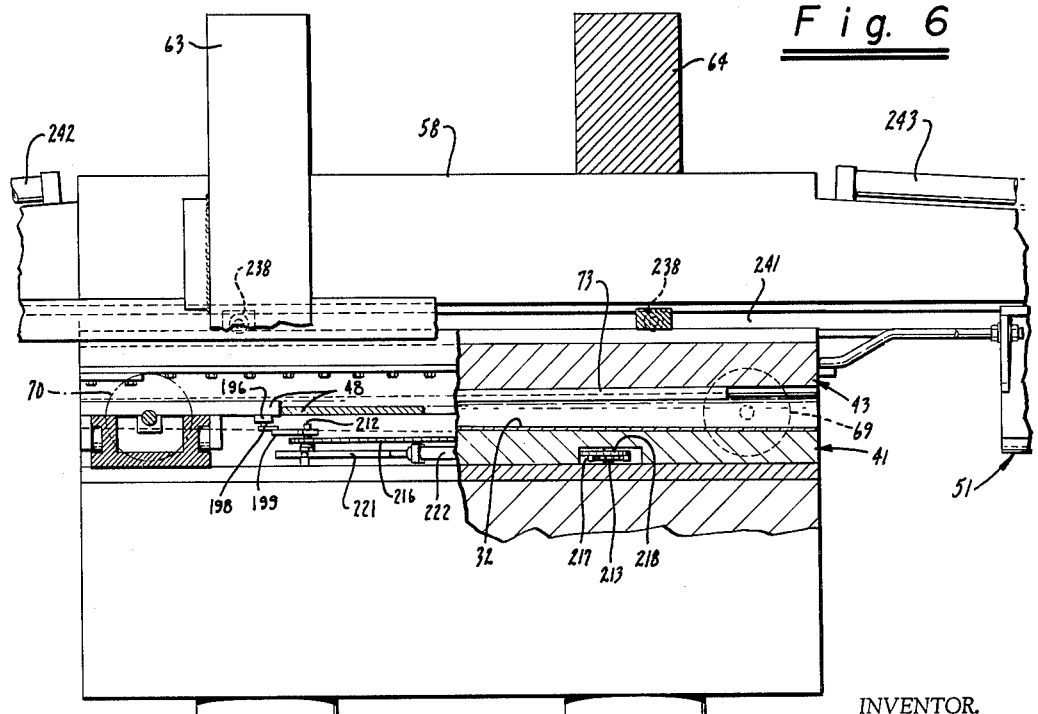
FIGURE 6 is a fragmentary front elevation of the apparatus on an enlarged scale with portions broken away and shown in cross-section.

The two top dies 43 and 51 are connected end to end by bar 50 and are mounted for longitudinal reciprocation in the top supporting structure 58 for interchangeable positioning over the bottom die 41. As seen in FIGURES 1 and 3, the connected top dies 43 and 51 are moved to the left, as seen in the drawing, so as to place die 51 in registration with the bottom die 41. In FIGURE 5 a reverse positioning of the two top dies is illustrated with the dies moved to the right as seen in the figure, and die 43 positioned in vertical registration with bottom die 41. As will be observed from FIGURE 2, the top dies are provided with side rollers 237 and 238 which are confined and guided in side channels 239 and 241 in the top supporting structure 58. Reciprocation of the top die members longitudinally of the channels and to and from their positions above described is here effected by a pair of hydraulic actuators 242 and 243 mounted on the top supporting structure 58 and having ram ends 244 and 246 connected by cables 247 and 248 to the opposite ends of the top die assembly. The cables are carried over sheaves, as illustrated in FIGURE 1 of the drawing, so that actuation of cylinder 242 drawing in ram end 244 will displace the top die assembly to the left, as seen in the figure; and contrari-wise actuation of hydraulic actuator 243 so as to draw in ram end 246 will cause a movement of the top die assembly to the right as seen in the figure.

With reference to FIGURE 30, it will be seen that hydraulic actuators 242 and 243 are appropriately connected to a four-way valve 249 having a high pressure fluid supply conduit 251 for alternately energizing actuators 242 and 243 upon displacement of valve 249 to alternate positions and which is here controlled by solenoid 252. The opposite ends of cylinders 242 and 243 are arranged to exhaust to the atmosphere and valve 249 is provided with a fluid drain conduit 253 returning to reservoir 127. Energizing of solenoid 252 for displacement of valve 249 to its two positions may be conveniently effected by switches provided in a control panel 254 at the front of the machine as seen in FIGURES 1 and 2.

*Operation*

Figure 2:
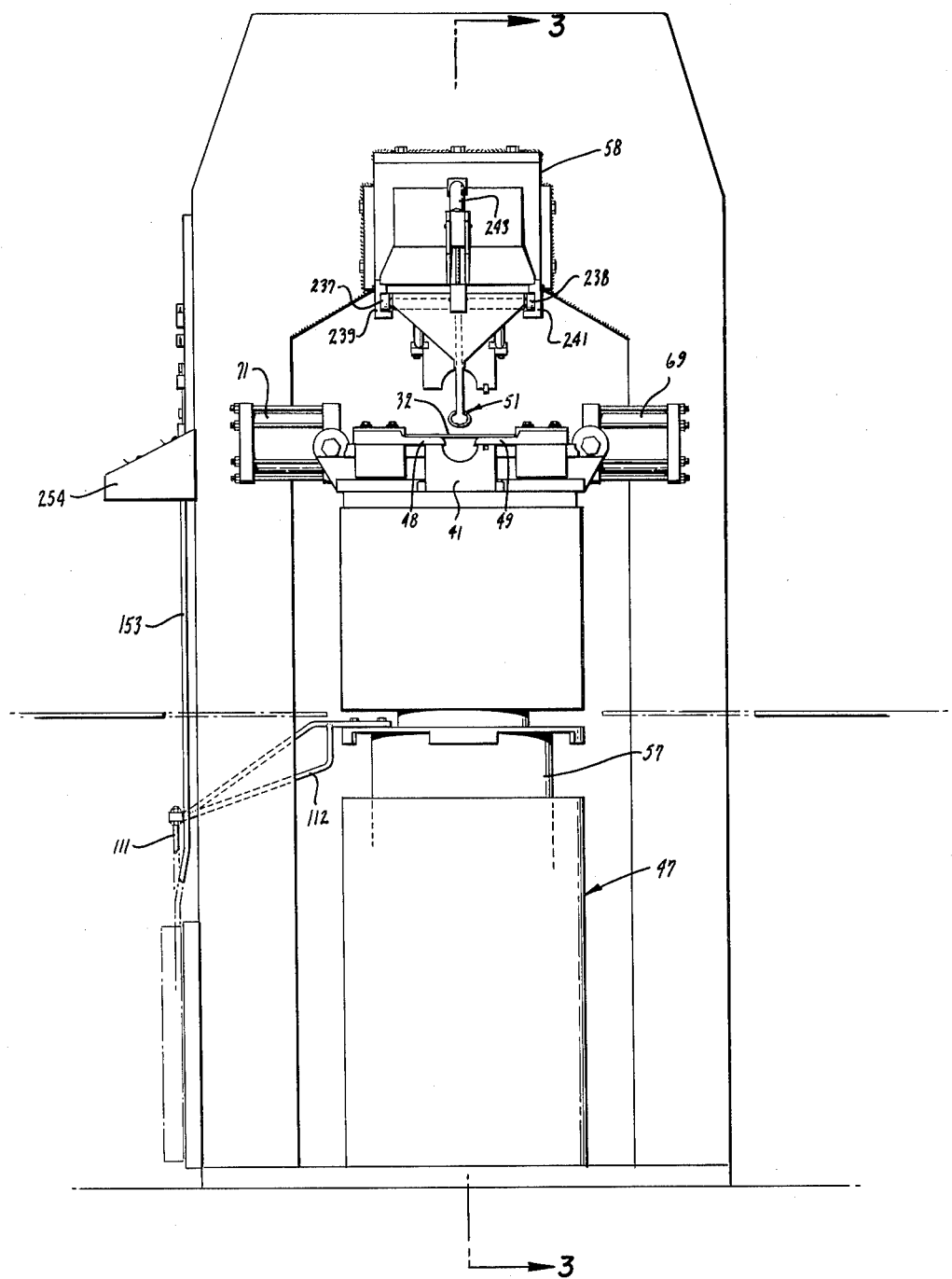
FIGURE 2 is an end elevation of the apparatus on a somewhat enlarged scale and taken from the position indicated by the line 2—2 of FIGURE 1.
Figure 3:
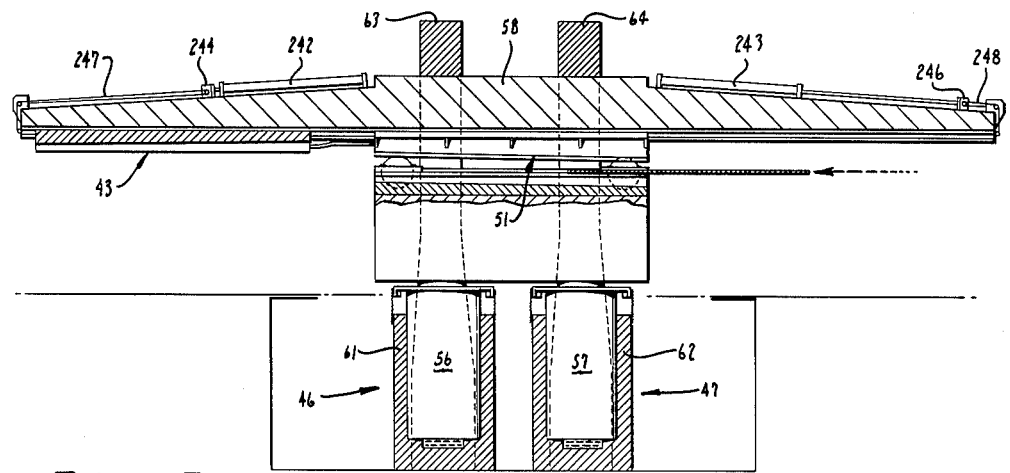
FIGURE 3 is a vertical cross-sectional view on a reduced scale of the apparatus and is taken substantially on the plane of line 3—3 of FIGURE 2.
Figure 22:
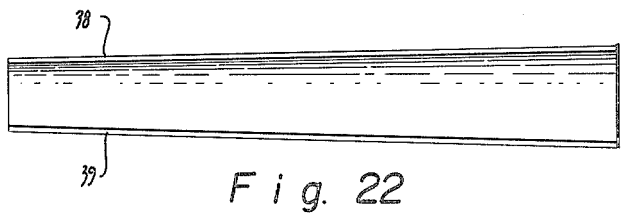
FIGURE 22 is a plan view of the sheet as folded in the first step, compare FIGURE 9.

At the start of operation, the several parts of the machine are moved to a position as generally depicted in FIGURES 2 and 8 wherein the forming blades 48 and 49 are extended over the forming edges of the bottom die 41 and the top pressure die 51 is rolled into position over the bottom die. A sheet 32 of material such as sheet steel and of trapezoidal form, as illustrated in FIGURES 20 and 21, is placed on the top of the forming blades 48 and 49. Pressure is applied through the hydraulic cylinders 46 and 47 moving the lower die 41 vertically and causing the material to assume a U-shape, as illustrated in FIGURES 9, 22 and 23.

Figure 12:
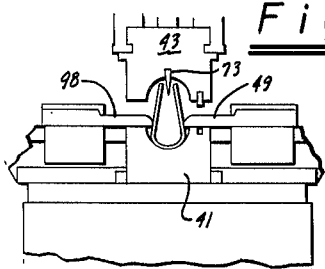
FIGURE 12 is an end elevation of the parts as they appear at the beginning of the third metal forming step.
Figure 13:
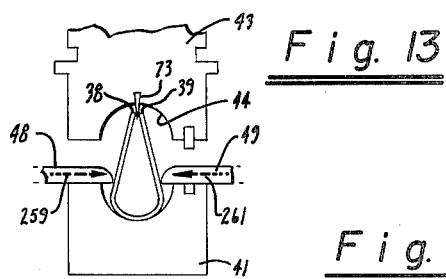
FIGURE 13 is an end elevation of the parts partially advanced during the third step.
Figure 24:
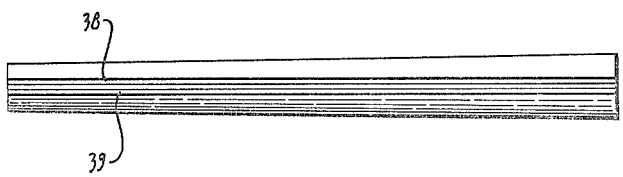
FIGURE 24 is a plan view of the sheet as further deformed in the second step of the method.

The forming blades 48 and 49 are next moved together, as suggested by arrows 66 and 67 in FIGURE 10, so as to cause the sheet to assume the teardrop shape, illustrated in FIGURE 10, and also FIGURES 24 and 25. The forming blades 48 and 49 are then retracted a prescribed distance horizontally, as suggested by arrows 256 and 257 in FIGURE 11, thereby permitting the opposite sides 36 and 37 of the sheet to open up slightly and the lower die 41 is lowered, as suggested by arrow 258, sufficiently to release pressure on the bottom of the sheet. The top pressure die 52 is then rolled out of position and the second top forming die 43 is rolled into position as illustrated in FIGURE 12.

The forming blades 48 and 49 are then moved inwardly, as suggested by arrows 259 and 261, so as to displace the edges 38 and 39 of the sheet against the opposite sides of the protrudance or tongue 73. Bottom die 41 is then moved vertically, as suggested by arrow 262, so as to position sheet ends 38 and 39 into the crotches or intersections between the opposite sides of tongue 73 and the die cavity 44 where the ends remain anchored during the balance of the forming step.

Figure 15:
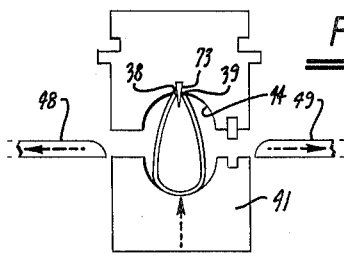
FIGURE 15 is an end elevation of the parts as they appear at the beginning of the fourth metal forming step.
Figure 19:
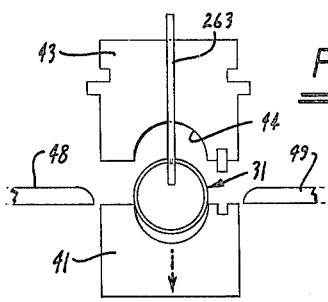
FIGURE 19 is an end elevation of the parts as they subsequently appear in the final fifth step of operation of the machine.

Forming blades 48 and 49 are then retracted horizontally, as suggested in FIGURE 15, so as to clear the sides of the top and bottom forming dies 41 and 43. The bottom die 41 continues to move upwardly causing the opposite sides 36 and 37 of the sheet to bow outwardly, as seen in FIGURE 16, and as the dies move to closed position, as seen in FIGURE 17, the ballooning sheet is held to a circular form in cross section. The forming dies are then separated, as illustrated in FIGURE 19, and if desired, a hook member 263 may be placed in engagement with the top die and one end of the finished taper so as to free it from the bottom die as the latter is retracted downwardly.

The required differential of movement of the opposite ends of the forming blades 48 and 49 and the bottom die 41 in order to produce the taper is illustrated in FIGURES 22 to 25. As will be observed, the differential of movement of the opposite ends of the forming blades in the several operational steps is depicted by dimension markings 264. The required differential movements of the opposite ends of the bottom die are depicted by dimension markings 266.

Figure 14:
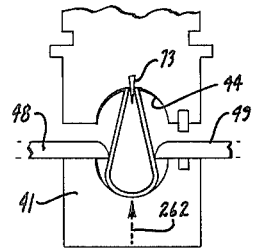
FIGURE 14 is an end elevation of the parts advanced to completion of the third step.

The placement of the free edges of the sheet at the joinder of the base of the outwardly protruding tongue and the interior surface of the die cavity, as illustrated in FIGURE 14, obviates completely any galling action of the free edges of the sheet across the die surface in the closing action of the dies. It will also be noted that no pre-forming of the edges of the sheet is required and no lubricant is required on the die surfaces.

The material of the sheet is completely upset in the final compression forming of the sheet. In tubular sections ranging up to about 10 to 12 inches in diameter, the circumference of the sheet is preferably foreshortened by a distance of approximately ¼ to ⅜ inch. This insures the taking of the material past its elastic limit in compression and the forming of a section which is perfectly round and of uniform wall thickness. Additionally, the final section is formed without residual spring back of its final form.

I claim:

1. The method of forming an elongated tubular taper of circular cross-section from a sheet of trapezoidal form having a width symmetrical to a longitudinal axis and which consists in first bending said sheet about its longitudinal axis to form a symmetrical U-shape having a curved base extending along said axis and a pair of convergently tapered sides extending therefrom, applying force on said base and the free edges of said sides to effect compression displacement of said sheet causing an outward bowing action of said sides away from each other and toward a circular conformation, regulating said compression displacement as a function of length of said sheet along said axis for uniformly and simultaneously effecting said bowing action, and holding said sides to a circular form in cross-section having a circumference varying along the length of said sheet as a function of the width of the sheet.

2. The method of forming an elongated tubular taper as characterized in claim 1 wherein said sheet is held to a circumference less than the width of said sheet at each longitudinal position thereon so as to provide a circumferential foreshortening of said sheet and flow of material therein.

3. The method of forming an elongated tubular taper as characterized in claim 2, wherein said free edges of said sheet are held in fixed spaced apart relation during said circumferential foreshortening of said sheet so as to define a longitudinally extending peripheral slot in said tubular taper formed by the within method.

4. The method of forming an elongated tubular taper of circular cross-section from a sheet of trapezoidal form having a width symmetrical to a longitudinal axis which consists in first bending said sheet about its longitudinal axis to form a symmetrical U-shape having a curved base extending along said axis and a pair of sides divergently extending therefrom, displacing said sides towards each other as a function of length of said sheet along said axis for uniformly and simultaneously effecting said displacement to positions converging from said base, applying force on said base and the free edges of said sides to effect compression displacement of said sheet causing an outward bowing action of said sides away from each other and toward a circular conformation, regulating said compression displacement as a function of length of said sheet along said axis for uniformly and simultaneously effecting said bowing action, and holding said sides to a circular form in cross-section having a circumference varying along the length of said sheet as a function of the width of the sheet.

5. The method of forming an elongated tubular taper of circular cross-section from a sheet of trapezoidal form having a width symmetrical to a longitudinal axis and which consists in first bending said sheet about its longitudinal axis to form a symmetrical U-shape having a curved base along said axis and a pair of convergently tapered sides extending therefrom, supporting said base in an elongated semi-circular die cavity having a radius progressively changing as a function of length and proportional to the width of said sheet, supporting the free edges of said sides in an opposed complementary die cavity having a closed position with said first die cavity to provide a tapered enclosure, and moving said die cavities to closed position to effect compression displacement of said sheet and outward bowing of said sides toward the circular conformation of said opposed die cavities, and regulating the closing movement of said die cavities as a function of length of said die cavities for obtaining simultaneous and uniform compression displacement of said sheet over its full length.

6. The method of forming an elongated tubular taper as characterized in claim 5, wherein said die cavities have a combined peripheral length less than the width of said sheet at each longitudinal position of said sheet so as to provide a circumferential foreshortening of said sheet and flow of material therein upon movement of said die cavities to closed position.

7. The method of forming an elongated tubular taper as characterized in claim 6, wherein said free edges of said sheet are held in fixed spaced apart relation during the closing movement of said die cavities so as to define a longitudinally extending peripheral slot in the tubular taper herein formed.

8. A machine for the production of an elongated tubular taper of circular cross-section comprising, a die member formed with an elongated semi-circular die cavity having a radius progressively changing as a function of length, a second die member formed with an opposed complementary die cavity having a closed position with said first die cavity to provide a tapered enclosure, and means moving said die members to closed position at rates of displacement varying longitudinally of said die cavities as a function of length so controlled that all longitudinal portions of said die cavities will arrive at closed position at substantially the same time.

9. In the production of an elongated tubular taper of circular cross-section from a sheet of trapezoidal form having a width symmetrical to a longitudinal axis and bent along its longitudinal axis to form a symmetrical U-shape having a curved base along said axis and a pair of convergently tapered sides extending therefrom, apparatus comprising a first die member formed with an elongated semi-circular die cavity having a radius progressively changing as a function of length and proportional to the width of said sheet and being adapted to support said base, a second die member formed with an opposed complementary die cavity adapted for engagement with the free edges of said sheet sides and having a closed position with said first die cavity providing a tapered enclosure, and means moving said die members to closed position to effect compression displacement of said sheet and outwardly bowing of said sides toward circular conformation of said opposite die cavities at rates of displacement varying longitudinally of said die cavities as a function of length and being controlled for effecting simultaneously and uniform compression displacement of said sheet over its full length.

10. An apparatus for producing an elongated tubular taper as characterized in claim 9 wherein said die cavities are formed with a combined peripheral length less than the width of said sheet at each longitudinal position of said sheet so as to provide a circumferential foreshortening of said sheet and flow of material therein upon movement of said die cavities to closed position.

11. An apparatus for producing an elongated tubular taper as characterized in claim 10, wherein said second die cavity is formed with a longitudinally extending internally projecting protuberance positioned for engagement with the longitudinal free edges of said sheet and for holding said free edges in fixed spaced apart relation during the closing movement of said die cavities thereby forming a longitudinally extending peripheral slot in the tubular taper formed.

12. In the production of an elongated tubular taper of circular cross-section from a sheet of trapezoidal form having a width symmetrical to a longitudinal center line, apparatus comprising a first die formed with an elongated semi-circular die cavity having a radius progressively changing as a function of length and proportional to the width of said sheet, a pair of elongated members mounted for reciprocation in superimposed relation to said die cavity and extending longitudinally on opposite sides thereof and being adapted to support said sheet with the center line thereof aligned with the center line of said die cavity, a second die having an elongated metal forming portion mounted in opposed relation to said die cavity of a length substantially coextensive therewith and of a width dimensioned to enter said cavity and adapted for engagement with said sheet along the longitudinal center thereof, means displacing said die members for deforming said sheet over the opposed edges of said members and into said cavity to provide a symmetrical U-shape having a curved base supported by said die cavity and a pair of sides diverging therefrom and engaged by said opposed edges of said members, and means jointly displacing said members towards each other at rates varying as a function of length and proportional to the width of said sheet so as to engage and displace said sheet sides to planes converging from said sheet base.

13. A machine for the production of an elongated tubular taper of circular cross-section from a sheet of trapezoidal form having a width symmetrical to a longitudinal center line comprising, a first die formed with an elongated semi-circular cavity having a radius progressively changing as a function of length and proportional to the width of said sheet, a pair of elongated members mounted for reciprocation in a common plane in superimposed relation to said die cavity and extending longitudinally on opposite sides thereof substantially coextensive therewith and being adapted to support said sheet with the center line thereof aligned with the center line of said die cavity, a second die mounted for movement into opposed relation to said die cavity and having an elongated metal forming portion of a length substantially coextensive with and dimensioned to enter said cavity and being adapted for engagement with said sheet along the longitudinal center thereof, means displacing said die members for deforming said sheet over the opposed edges of said members and into said cavity to provide a symmetrical U-shape having a curved base supported by said die cavity and a pair of sides diverging therefrom, means jointly displacing said members toward each other at rates varying as a function of length and proportional to the width of said sheet so as to engage said sheet sides to planes converging from said sheet base and being formed to displace said members away from said first die member, a third die moveable into opposed relation with said first die and having an elongated semi-circular die cavity adapted for engagement with the free edges of said sheet sides and formed of progressively changing radii complementary to and formed to close with said first mentioned die cavity to provide a tapered enclosure, and means moving said first and third die members to closed position to effect compression displacement of said sheet and outward bowing of said sides toward circular conformation of said opposite die cavities at rates of displacement varying longitudinally of said die cavities as a function of length and being controlled for effecting simultaneous and uniform compression displacement of said sheet over its full length.

14. A machine for the production of an elongated tubular taper of circular cross-section from a sheet of trapezoidal form having a width symmetrical to a longitudinal center line comprising, a support, a pair of vertically reciprocating hydraulic rams carried by said support, an elongated generally horizontally disposed first die mounted on said rams for vertical reciprocation thereby and being formed with an elongated semi-circular cavity having a radius progressively changing as a function of length and proportional to the width of said sheet, a pair of elongated members mounted for reciprocation in a common plane in superimposed relation to said die cavity and extending longitudinally on opposite sides thereof substantially coextensive therewith and being adapted to support said sheet with the center line thereof aligned with the center line of said die cavity, a second die mounted for movement into superimposed relation to said die cavity and having an elongated metal forming portion of a length substantially coextensive with and dimensioned to enter said cavity and being adapted for engagement with said sheet along the longitudinal center thereof, said first die having a first upward displacement for deforming said sheet over the opposed edges of said members and into said cavity to provide a symmetrical U-shape having a curved base supported by said die cavity and a pair of sides diverging therefrom, means jointly displacing said members toward each other at rates varying as a function of length and proportional to the width of said sheet so as to engage said sheet sides to planes converging from said sheet base and being formed to displace said members away from said first die member, a third die moveable into superimposed relation with said first die and having an elongated semi-circular die cavity adapted for engagement with the free edges of said sheet sides and formed of progressively changing radii complementary to and formed to close with said first mentioned die cavity to provide a tapered enclosure, said first die having a second displacement toward closing with said third die to effect compression displacement of said sheet and outward bowing of said sides toward circular conformation of said opposite die cavities, and means controlling the flow of hydraulic fluid to said rams for causing movement thereon in said first and second displacements at rates of varying longitudinally of said die cavities as a function of length.

15. A machine for the production of an elongated tubular taper of curved cross-section from a sheet comprising, a first die formed with an elongated concave cavity, a pair of elongated members mounted for reciprocation in superimposed relation to said die cavity and extending longitudinally on opposite sides thereof substantially coextensive therewith and being adapted to support said sheet with the center line thereof aligned with the center line of said die cavity, a second die mounted for movement into opposed relation to said die cavity and having an elongated metal forming portion of a length substantially coextensive with and dimensioned to enter said cavity and being adapted for engagement with said sheet along the longitudinal center thereof, means displacing said die members for deforming said sheet over the opposed edges of said members and into said cavity to provide a symmetrical U-shape having a curved base supported by said die cavity and a pair of sides diverging therefrom, means jointly displacing said members toward each other so as to engage and move said sheet sides to planes converging from said sheet base, a third die moveable into opposed relation with said first die and having an elongated concave die cavity adapted for engagement with the free edges of said sheet sides and formed to close with said first mentioned die cavity to provide a tubular enclosure, and means moving said first and third die members to closed position to effect compression displacement of said sheet and outward bowing of said sides toward tubular conformation.

References Cited by the Examiner

UNITED STATES PATENTS

| | | | |
|---|---|---|---|
| 400,025 | 3/1889 | Wilmot | 72—51 |
| 1,330,782 | 2/1920 | Brown | 113—33 |
| 1,879,077 | 9/1932 | Carsen | 113—33 |
| 1,879,078 | 9/1932 | Carlsen | 113—33 |
| 2,074,986 | 3/1937 | Lagerblade | 29—477 |

FOREIGN PATENTS 21,323    4/1930    Australia.

CHARLES W. LANHAM, *Primary Examiner.*

R. J. HERBST, *Assistant Examiner.*